(12) United States Patent
Blevins (10) Patent No.: US 9,121,546 B2
(45) Date of Patent: Sep. 1, 2015

(54) DEVICE FOR HOLDING PORTABLE ELECTRONICS

(71) Applicant: Conrad Scott Blevins, Los Angeles, CA (US)

(72) Inventor: Conrad Scott Blevins, Los Angeles, CA (US)

(*) Notice: Subject to any disclaimer, the term of this patent is extended or adjusted under 35 U.S.C. 154(b) by 354 days.

(21) Appl. No.: 13/756,407

(22) Filed: Jan. 31, 2013

(65) Prior Publication Data

US 2013/0193909 A1    Aug. 1, 2013

Related U.S. Application Data

(60) Provisional application No. 61/592,619, filed on Jan. 31, 2012.

(51) Int. Cl.
*H02J 7/00* (2006.01)
*F16M 11/04* (2006.01)
*F16M 11/10* (2006.01)
*F16M 11/24* (2006.01)
*F16M 13/00* (2006.01)

(52) U.S. Cl.
CPC .............. *F16M 11/04* (2013.01); *F16M 11/10* (2013.01); *F16M 11/242* (2013.01); *F16M 13/00* (2013.01); *H02J 7/0042* (2013.01)

(58) Field of Classification Search
CPC ............................... F16M 11/04; H02J 7/0042
USPC .......................................................... 320/107
See application file for complete search history.

(56) References Cited

U.S. PATENT DOCUMENTS

| 6,932,309 | B1* | 8/2005 | Corey et al. ................ 248/231.9 |
| 7,861,985 | B2* | 1/2011 | Galvin ........................... 248/160 |
| 8,544,161 | B2* | 10/2013 | Carnevali ........................ 29/450 |
| 2005/0258317 | A1* | 11/2005 | Weder ........................ 248/163.1 |
| 2009/0127411 | A1* | 5/2009 | Aguilar ....................... 248/205.8 |

FOREIGN PATENT DOCUMENTS

TW        M399248 U     3/2011

\* cited by examiner

*Primary Examiner* — Sun Lin
(74) *Attorney, Agent, or Firm* — Hodgson Russ LLP (57) ABSTRACT

A device for holding portable electronics is disclosed. In one embodiment, the device comprises a base having a first end, and a second end, the first end positioned on one side of the base, and the second end positioned on a side of the base substantially opposite to the first end. The base has a plurality of apertures extending from the first end, through the base, to the second end; and at least one groove configured to receive an edge of the display. The device has a plurality of flexible legs configured to pass through an aperture in the base.

15 Claims, 10 Drawing Sheets

DEVICE FOR HOLDING PORTABLE ELECTRONICS

CROSS-REFERENCE TO RELATED APPLICATIONS

This application claims priority to U.S. Provisional Application No. 61/592,619 filed on Jan. 31, 2012, the disclosure of which is incorporated herein by reference.

FIELD OF THE INVENTION

The invention relates to devices for holding electronics, including portable electronics such as tablet computers.

BACKGROUND OF THE INVENTION

There are a variety of tablet computer accessory devices designed to hold a tablet computer hands-free (e.g., without the need for a user to hold the tablet computer with their hands or any other body part) and/or stationary in a variety of user situations. Of these existing devices, they can be divided into four broad categories.

Category A: This category represents devices that are generally intended to be used on a flat surface as a stand. They comprise, generally, a planar surface for contact with the flat surface and another surface projecting upward from the planar surface. Some devices in this category function as both covers and stands.

These aforementioned devices are used to prop-up a tablet computer for hands-free use. However, the devices in this category are limited in that they require a flat and stable surface for stability.

Category B: A second category of devices hold the tablet in an upright position, but without the need for a flat surface such as a table-top. In lieu of a flat surface, devices in this category are able to prop up tablets with the use of a body part of a user, such as the legs or lap of a user.

The devices in this category, unlike those in Category A, can be used without a flat and stable surface to rest the device on. They use various body parts of the user to maintain their stability. The limitation of the devices in this category is that the user must remain still to avoid movement of the device. When the body part that the device is resting on moves, so does the device, thus limiting the user's movement and ease of use.

Category C: The devices in this category are able to hold tablets in an upright position while the user is in a bed or chair, without having to rest it on the user's body part. This category shares some characteristics with those devices in both category A and B. Devices in this category have a piece that rests on an adjacent surface and a single arm to hold the tablet in place.

These devices allow tablets to be used while the user is in a bed or a chair, without having to rest the device on a body part, however the limitation of devices in this category is that while they allow tablets to be used in a bed or a chair, they still require an adjacent flat and stable surface for the piece of the device to rest on or be affixed to. As such, they are not useable in situations where an adjacent stable platform is not available. An additional limitation of this category of design is that due to the mount being suspended on a single arm/leg, there is a lack of stability when typing or otherwise using the touch-screen of the device being held; thus resulting in unwanted swaying or movement of the device.

Category D: This category addresses the limitations of all the previous categories in terms of using tablets in a bed or chair without either a flat resting surface or having to rest such devices on a body part. Instead, they depend on rigid arms resting on a surface to support tablets.

The devices in this category allow for a tablet computer to be used in a bed or a chair without the need to rest on a body part or have an additional flat or adjacent stable surface to rest the device on. However, the devices in Category D have several limitations.

First, the fixed plane configuration of the individual legs that support the device make them less than satisfactory, in terms of stability, for use on a bed or cushioned surface—especially one that may be exceptionally uneven on the surfaces where the legs rest. This results in a potential tilting of the viewing angle in the left-right axis that cannot be overcome, as the portion of the device that the tablet rests on is fixed to a 90 degree angle to the vertical plane of the supporting legs. If the legs are on uneven surfaces, then the left-right horizontal viewing axis will be tilted, resulting in a tilted viewing angle for the user.

A second limitation of category D designs are that they do not allow for a toward-the-face viewing angle that is less than 90 degrees. This prevents viewing a tablet device from a head-on direction while lying in a full supine position.

Attempts to overcome these issues have been unsuccessful. Some designs add a single-arm flexible neck which is attached to a central joining piece. However, the single-arm neck adds height to the whole assemblage and must be bent off center from the joining piece to place a tablet computer in a viewable position. This configuration gives the device a higher center of gravity, making it less stable and more top-heavy.

Other designs attach legs to the underside of a central joining piece, requiring the legs to make a 90° vertical turn upward into the body. This configuration uses more leg length than necessary for the function of the device. It also adds more extraneous height and bulk, making it clunky and giving it an awkward, less usable profile.

Further designs use gooseneck legs attached to the center body using male and female threaded ends. Given that the function of the gooseneck legs are made to be bendable into various shapes, the twisting and turning of the legs cause the threaded ends to easily loosen and twist inside of the central joining piece (i.e., become unscrewed), thereby reducing the devices functionality and usability.

BRIEF SUMMARY OF THE INVENTION

The invention overcomes these limitations in the prior art. For example, the present invention overcomes the center-of-gravity issues caused by a single-arm neck by mounting the tablet directly to the base, thereby eliminating the neck entirely while lowering the center of gravity of the unit when the tablet is mounted. As such, it is more stable than previous designs.

The present invention also overcomes height and bulk issues present in the prior art. For example, by using legs that run through both sides of the center body, the length of the legs are decreased, no extraneous height is added, and the number of bends in the leg decreases. As such, a more compact, stable, and usable design with a lower-center of gravity is achieved.

The present invention also overcomes the unintentional disassembly issues present in the prior art. For example, one embodiment of the present invention uses two long legs coming out of either side of the mounting base, giving the appearance of 4 legs without the extra cost. The legs do not attach to the mounting base, but instead run through it. This configuration eliminates the need for threaded ends and eliminates the possibility of the legs becoming detached when being moved.

The present invention can be described as a device for holding portable electronic units having an edge. The device comprises a base and two or more flexible legs. The base as a first end, a second end, and a second end substantially opposite the first end. The first end and the second end are substantially parallel to each other. The base also has two or more apertures. Each aperture extends through the base from the first end to the second end. The base also has a groove configured to receive the edge of the electronic unit. The grove may extend from the first end to the second end. In some embodiments, the base also has a cutout in between the first end and the second end.

The flexible legs each have a first leg end, a second leg end, and a central portion. The central portion is disposed within the aperture such that the first leg end extends past the first end of the base, and the second leg end extends past the second end of the base. The legs may be fixedly attached to the base. In some embodiments, each first leg end and each second leg end has a removable cap. The removable cap may be larger than the aperture in the base. The removable caps may also be configured to be a suction cup.

The base may be configured to prevent the electronic unit from moving in the groove. In one embodiment, the base also has an elastic band. The band is anchored to the base and configured to engage a second edge of the electronic unit. The band may also have a clip configured to engage the second edge of the electronic unit.

In one embodiment, the base further comprises a charging receptacle configured to provide power to the electronic unit. In another embodiment, there is more than one groove, and each grove is configured to hold the electronic unit at a different angle relative to the base.

The present invention may also be described as a hands free holding device. The device has a base and two flexible legs.

In this embodiment, the base has a first end, a second end, and an intermediate section. The first end is positioned on one side of the intermediate section, and the second end is positioned on a side of the intermediate section, substantially opposite to the first end. The base also has two apertures. Each aperture extends from the first end, through the intermediate section, to the second end. The base also has three grooves positioned substantially parallel to each other in the intermediate section. Each groove is configured to receive a display. Each groove is configured to receive the display at a different angle.

The legs each have a first leg end and a second leg end. Each leg is configured to pass through an aperture in the base such that the first leg end extends past the first end of the base, and the second leg end extends past the second end of the base.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

The invention can be described as a device for holding portable electronic units. The term portable electronic units encompasses devices such as, but not limited to, tablet computers, e-readers, mobile phones, LCD displays, speakers, GPS units, and clocks. The portable electronic unit, in whatever form it may take, will have an edge. The edge may be square, rounded, or beveled. The edge may have variable thickness, or a single thickness. The thickness of the edge may vary from unit to unit.

Figure 1:
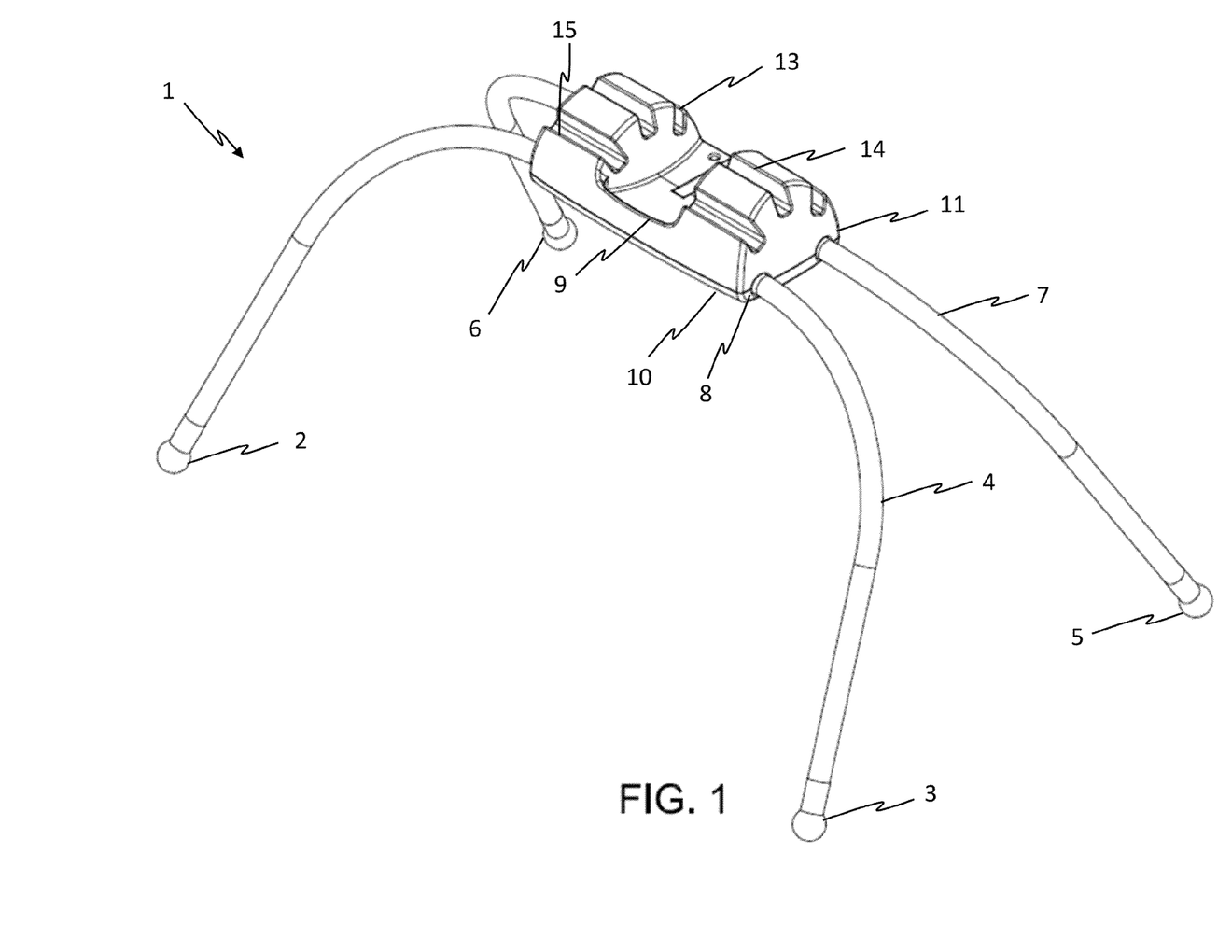
FIG. 1 is a front perspective view of one embodiment of the present invention.
Figure 2:
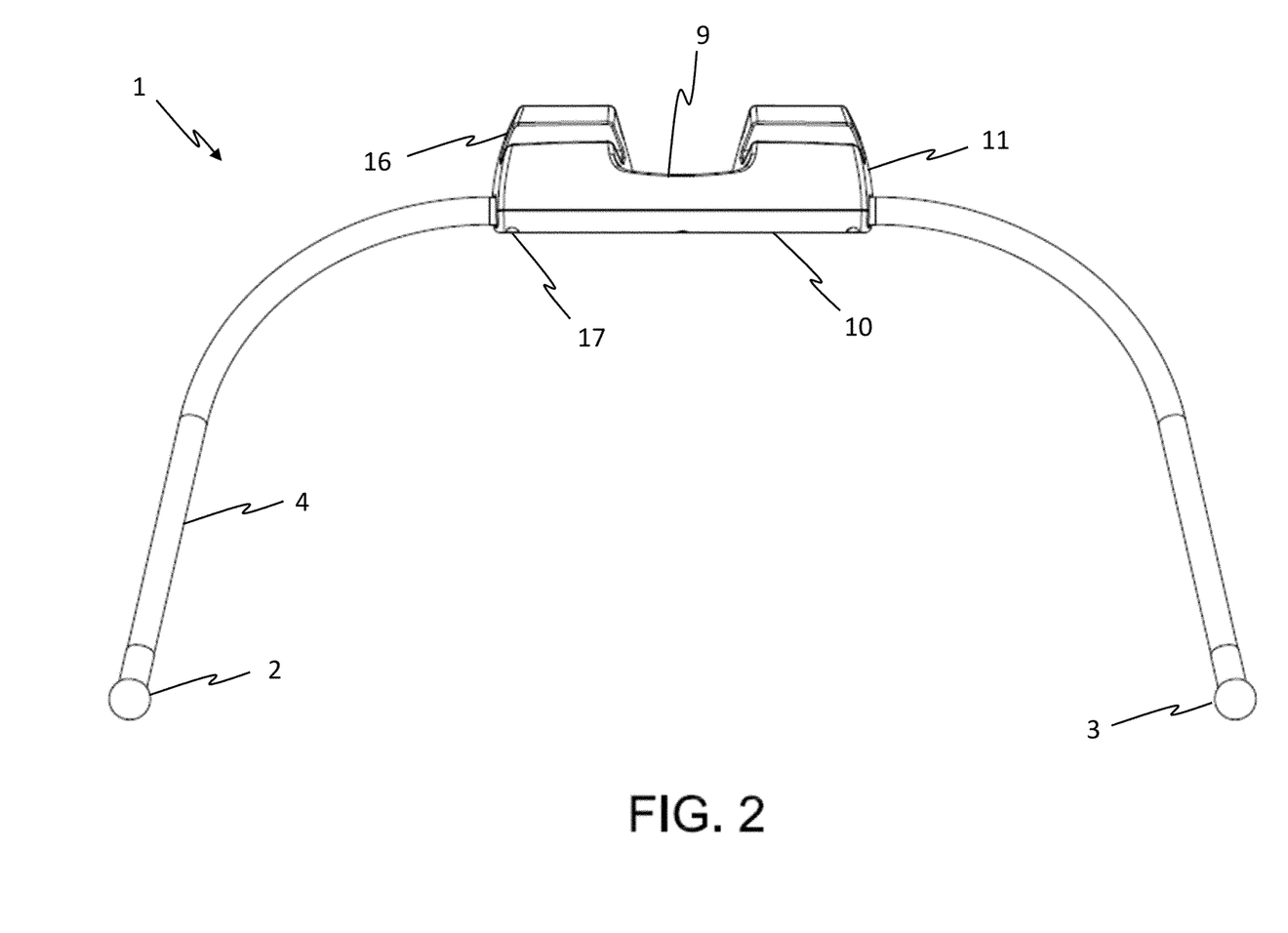
FIG. 2 is a front view of the embodiment shown in FIG. 1.
Figure 6:
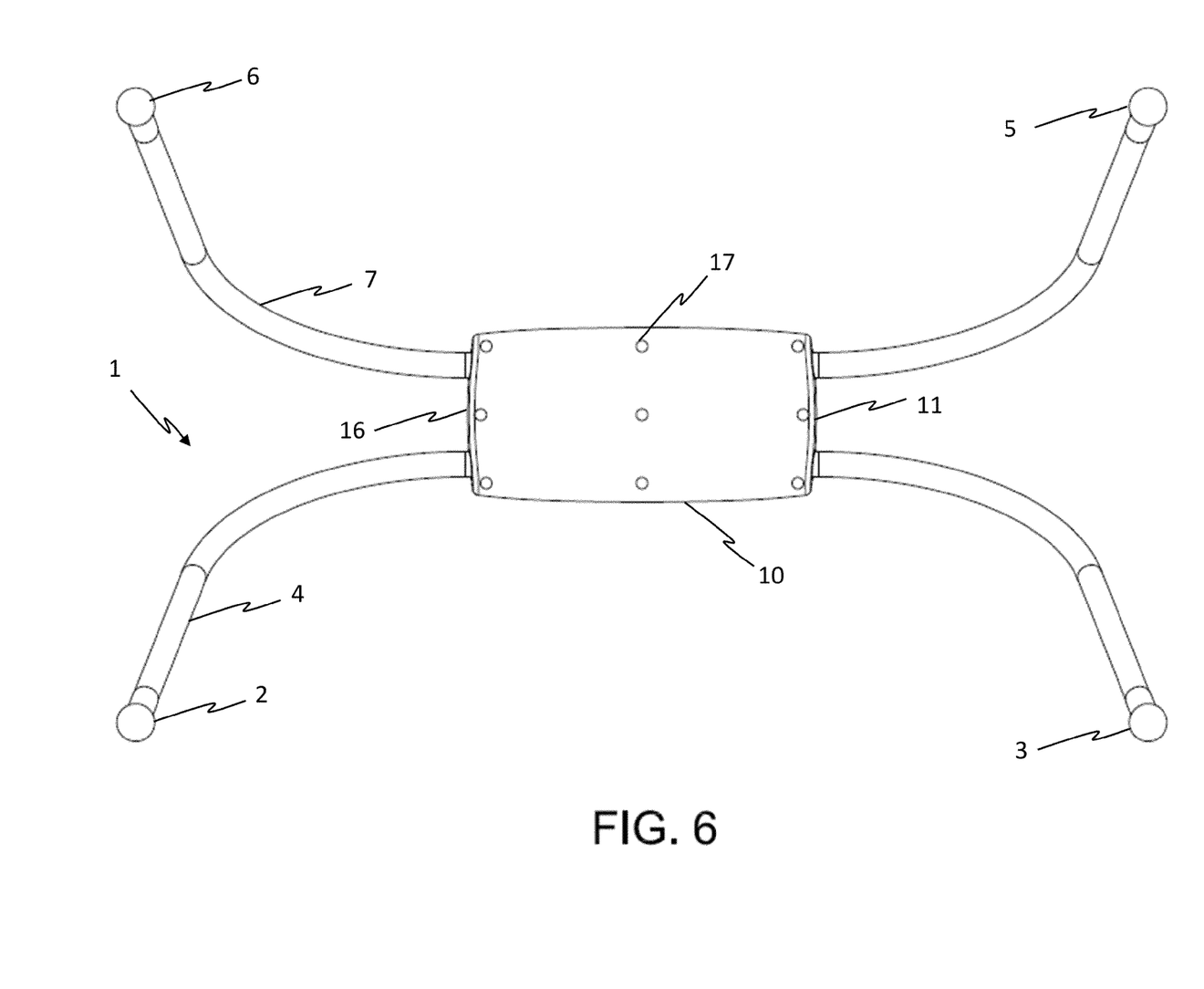
FIG. 6 is a bottom view of the embodiment shown in FIG. 1.

FIG. 1 shows one embodiment of a device 1 according to the present invention. The device 1 comprises a base 9. The base 9 may be made of a sturdy material such as plastic or metal. Other materials may be used as known in the art. The base 9 may be formed as a single piece or assembled from multiple pieces. For example, the base 9 may be formed from an upper portion and a lower portion 10. The lower portion 10 may be attached to the base through use of an adhesive or through screws or other fastening methods. FIGS. 2 and 6 illustrate possible locations for screws and screw covers 17. The lower portion 10 may be substantially flat. A flat lower portion 10 may make it more comfortable for a user to place the device 1 above their lap.

Figure 3:
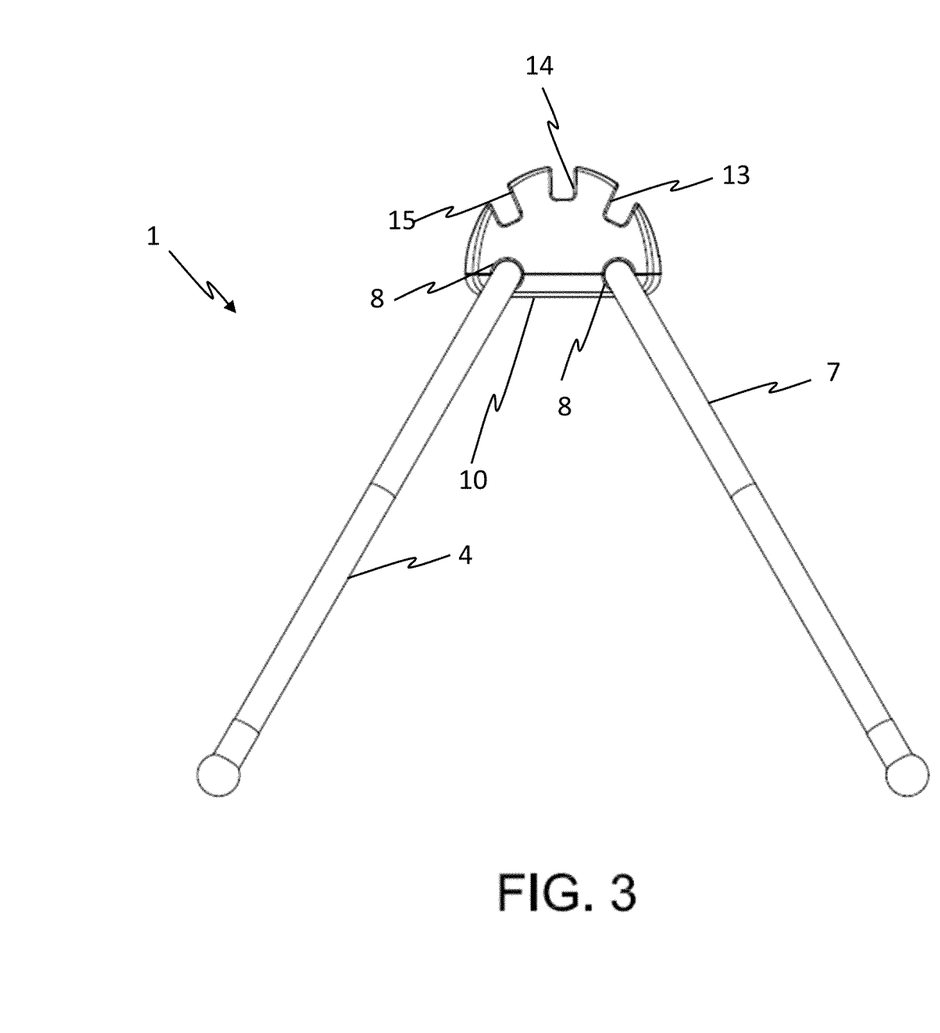
FIG. 3 is a right side view of the embodiment shown in FIG. 1.

The base 9 has a first end 11 and a second end 16 (as seen in FIGS. 2 and 3). The first end 11 and the second end 16 may be the same size and shape or have different sizes or shapes. The second end 16 is substantially opposite from the first end 11. In some embodiments, the first end 11 and the second end 16 are substantially parallel to each other. The base 9 may also be curved in an arch or some other shape. The base 9 also has two or more apertures 8 extending through the base 9. The apertures 8 extend through the base from the first end 11 to the second end 16. The apertures 8 may be formed when the base 9 is formed using two pieces. The apertures 8 may have a consistent radius through the base 9. In other embodiments, the apertures 8 may vary. The apertures 8 may be a straight line or may be curved.

The base 9 also has a groove configured to receive the edge of the electronic unit. In some embodiments there may be more than one groove 13, 14, 15. The grooves 13, 14, 15 may be placed in the base at various angles such that the electronic unit is also angled. For example, the grooves 13, 14, 15 may be angled at 45, 90, and 135 degrees from the lower portion 10 of the base. The grooves 13, 14, 15 may be formed to have a higher coefficient of friction with which to grab the edge of the electronic unit. In other embodiments, frictional materials such as felt or rubber may be added to the interior of the grooves 13, 14, 15. The grooves 13, 14, 15 may also be of various sizes to accommodate edges of various electronic units. In some embodiments, a lining may be added to alter the size of grooves 13, 14, 15.

Figure 4:
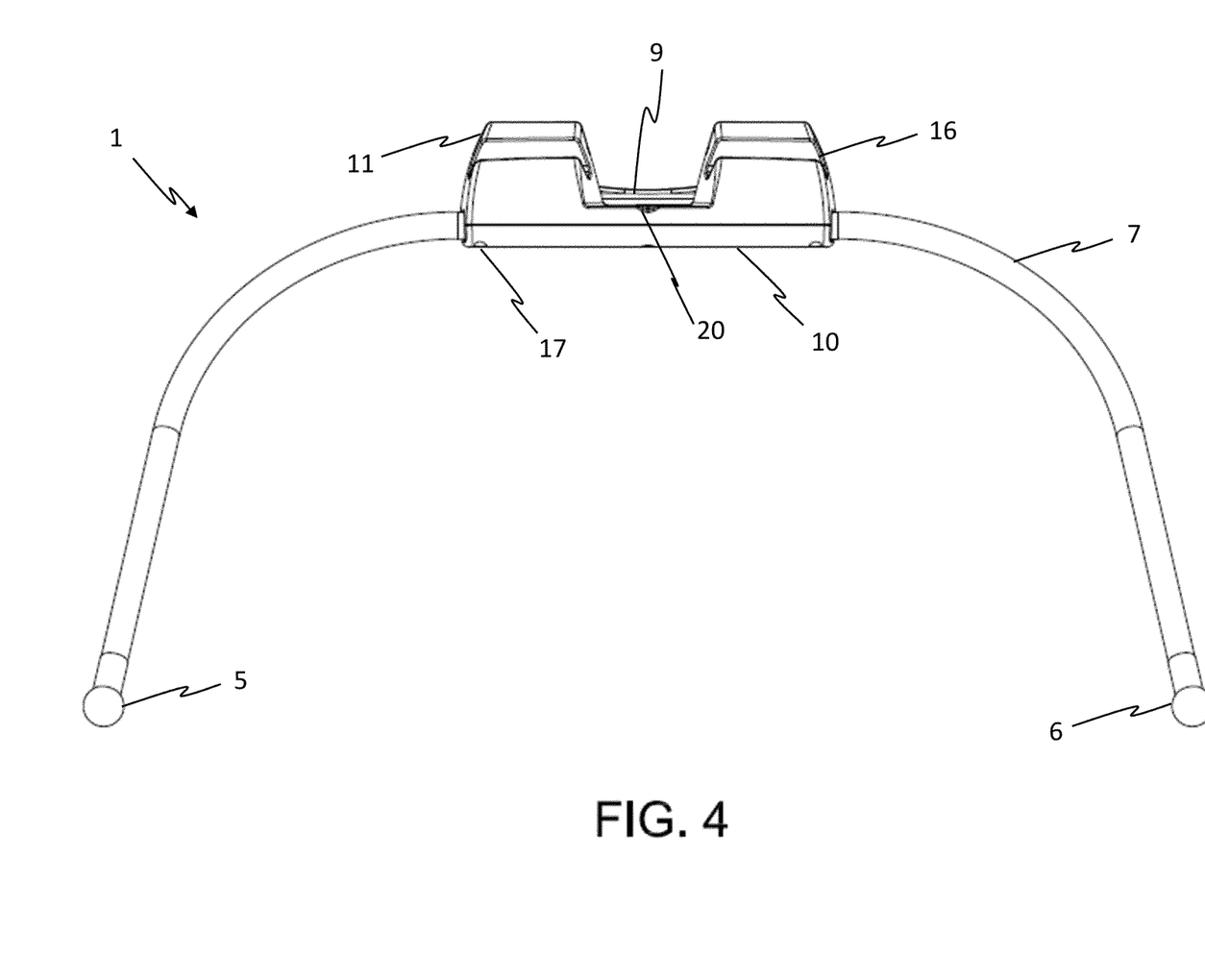
FIG. 4 is a rear view of the embodiment shown in FIG. 1.

The base 9 may be shaped in a number of ways to be aesthetically pleasing. For example, the grooves 13, 14, 15 may be interrupted by a hollowed out portion in the base as shown in FIGS. 2 and 4. In other embodiments, the grooves 13, 14, 15 may extend from the first end 11 to the second end 16. The base 9 may be beveled or have square edges. The base 9 may be rectangular, trapezoidal, or some other suitable shape. However, in some embodiments, the legs will extend from the side of the base 9 such that the legs leave the base 9 substantially parallel to the viewing plane of the electronic unit.

Figure 5:
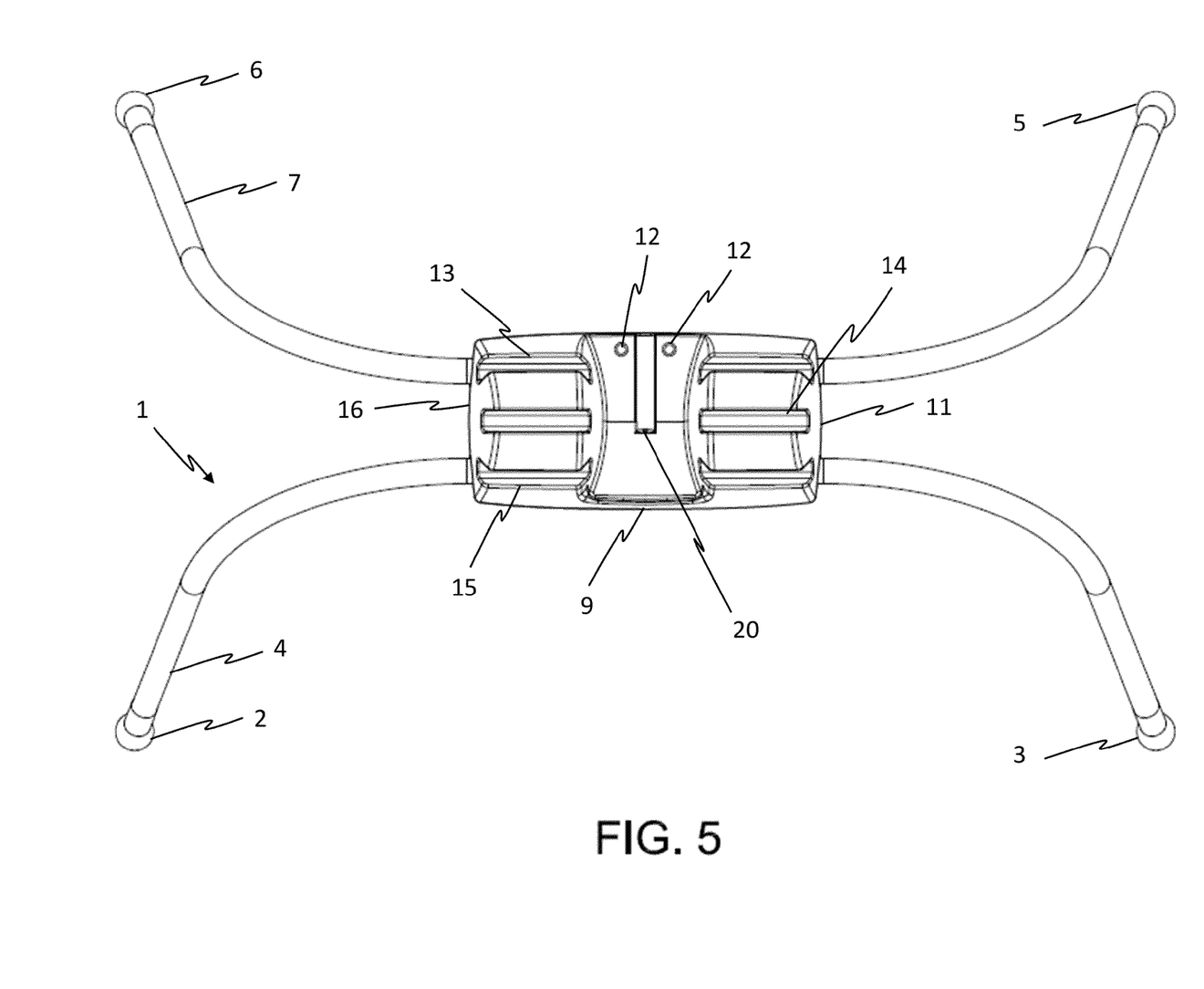
FIG. 5 is a top view of the embodiment shown in FIG. 1.

The base 9 may also comprise fastening points 12 for anchoring a retaining mechanism for the electronic unit. The base 9 may also comprise a recessed portion 20 as shown in FIG. 5. The recessed portion 20 may extend entirely across the base 9, or only across a portion of the base 9. The recessed portion 20 may be formed to manage any cords protruding from the electronic unit and guide their placement.

The device also comprises two or more flexible legs 4, 7. The legs 4, 7 may each have a first leg end 3, 5 and a second leg end 2, 6. The legs 4, 7 also have a central portion connecting the first leg end 3, 5 and the second leg end 2, 6. The central portion is disposed within the apertures 8 such that the first leg end 3, 5 extends past the first end 11 of the base 9, and the second leg end 2, 6 extends past the second end 16 of the base 9. The flexible legs 4, 7 are made of a material that is both pliable and resilient such that it can be bent but does not return to its original shape after being bent. The legs 4, 7 may be of various stiffness. For example, the legs 4, 7 may be formed such that the central portion disposed between the first end 11 and second end 16 is more stiff than the rest of the leg 4, 7, or vice versa. The legs 4, 7 may also be of various lengths. In one embodiment, each leg 4, 7 is 33 inches long. The legs 4, 7 may be fixedly attached to the base 9. The legs 4, 7 may be frictionally attached, for example, due to the shape and contour of the apertures 8. The legs 4, 7 may also be attached through the use of an adhesive or some other means known to one in the art.

In another embodiment, the legs 4, 7 may remain unattached to the body 9. In this embodiment, the user could adjust the length of the legs 4, 7 extending past the first end 11 or the second end 16. The legs 4, 7 and apertures 8 may be formed in such a way to cause enough friction to hold the legs 4, 7 in place, yet make the legs 4, 7 easy to move through the base 9 when needed.

In one embodiment the leg ends 2, 3, 5, 6 may be removable from the legs 4, 7. For example, the leg ends 2, 3, 5, 6 may attached to the legs 4, 7 with screws, or ball-and-socket joints. The leg ends 2, 3, 5, 6 may be formed in a variety of shapes. For example, the leg ends 2, 3, 5, 6 may be suction cups for gripping solid surfaces, flat, rough, smooth, buoyant, or otherwise formed. In some embodiments, the leg ends 2, 3, 5, 6 have a removable cap. The cap may be larger than the apertures 8. In this way, the cap can be removed from the legs 4, 7 and the legs 4, 7 may be removed from the base 9. Likewise, the device could be reassembled by passing the legs 4, 7 through the apertures 8 in the base 9 and reattaching the cap.

In another embodiment, the base 9 may further comprise a charging receptacle configured to provide power to the electronic unit.

Figure 7:
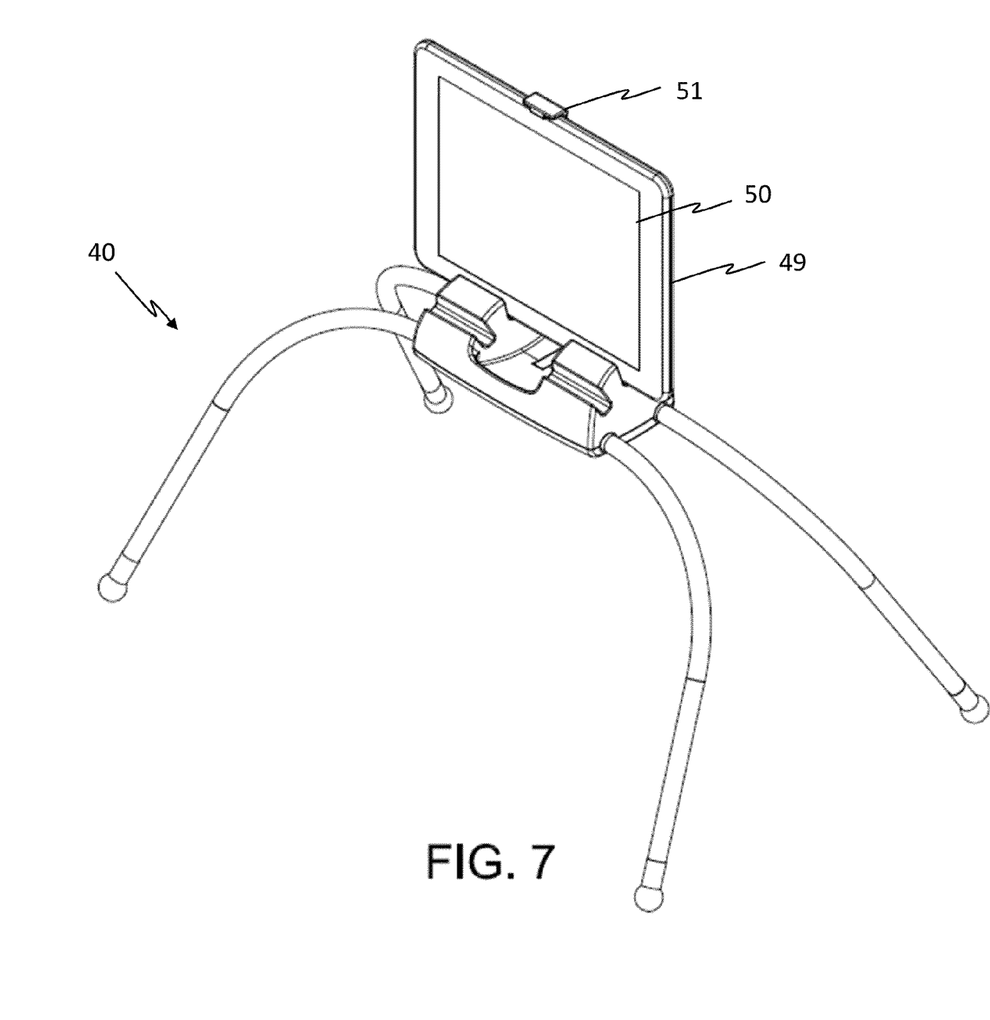
FIG. 7 is a front perspective view of one embodiment of the present invention holding an electronic unit.

FIG. 7 describes one embodiment of a device 40 that is holding an electronic device 49. The device has a viewing plane 50 that faces a user using the device 40. The electronic device 49 is being held in the groove of this device with clip 51. The clip 51 is attached to the base of this device (not shown in FIG. 7).

Figure 8:
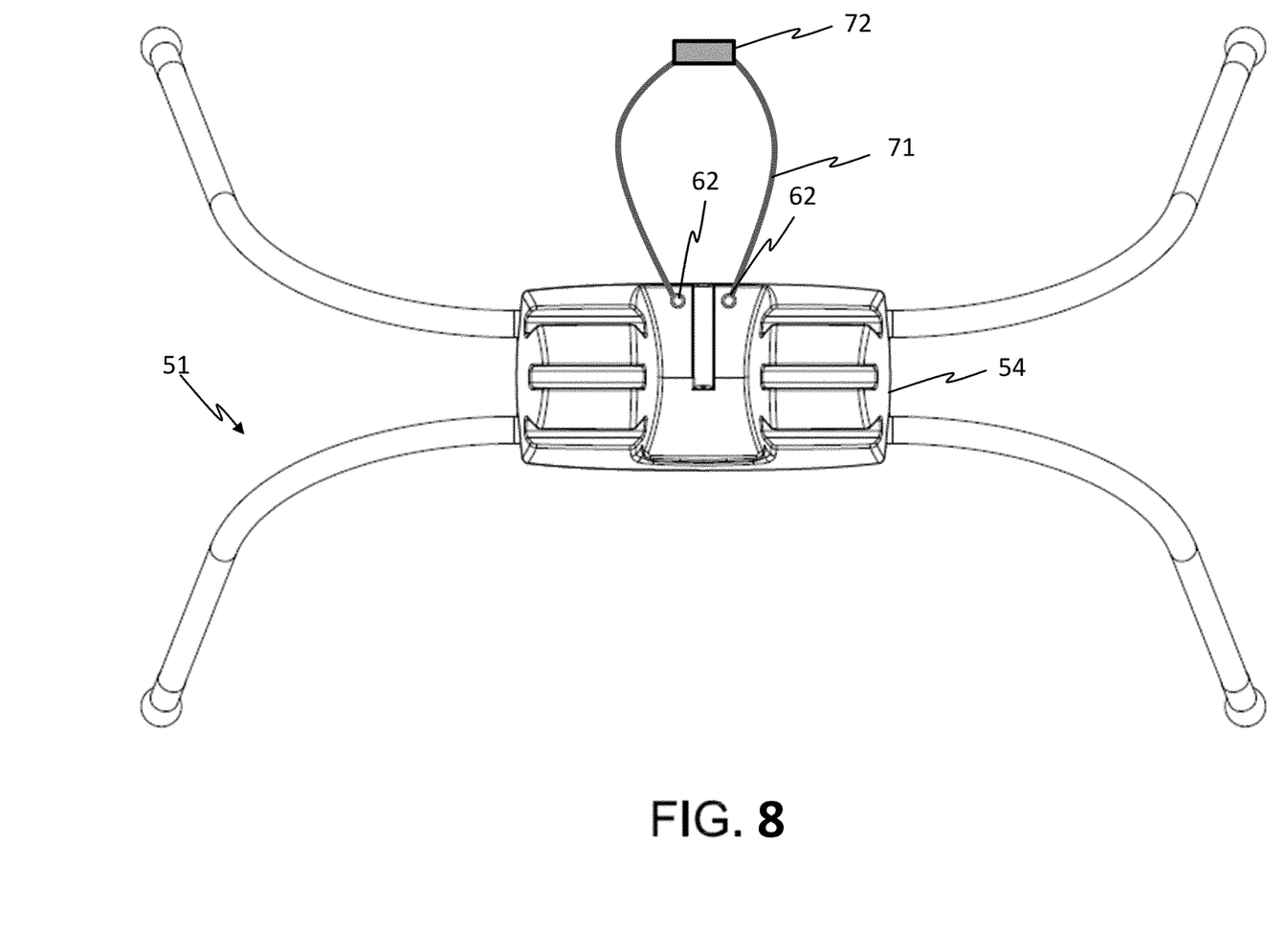
FIG. 8 is a top view of one embodiment of the present invention having an elastic band and clip.

FIG. 8 describes one embodiment of a device 51 that further comprises an elastic band 71. In other embodiments, the band 71 may be made from non-elastic material. The band 71 may be anchored to the base 54 at anchor points 62. In other embodiments, a single anchor point 62 may be used. For example, the band 71 may be an elastic ribbon that is mounted to a single anchor point 62. The anchor points 62 may be apertures in the base 54 such that the band 71 can pass through the apertures in one direction, but not the other. The band 71 may also be mounted to the base 54 using an adhesive or another method known in the art. In other embodiments, the band 71 may be a solid piece designed to support the electronic unit.

The band 71 may have a clip 72 attached to it. The clip 72 may be configured to engage a second edge of the electronic unit. For example, the clip 72 may be curved or angled to match the second edge of a particular electronic unit. When attached, the clip 72 applies downward pressure on the electronic unit because of the elastic nature of the band 71. This pressure increases the frictional grip on the first edge of the electronic unit in the groove.

In one embodiment, it may be advantageous to use two legs and two sets of apertures in the device to reduce material costs and ease the manufacture of such a device. For example, the base can be split into two separate parts that when joined, form apertures for the legs. When assembling the device, the legs can be placed in one half of the base. After the legs are properly positioned, the second piece of the base can be attached, both forming the entire base and simultaneously holding the legs into place. Unlike other designs, only two legs are needed to fully support the base, and no mechanisms are needed to hold the legs into the base (such as screws or pins).

In another embodiment, the device comprises a base having a first end, a second end, and an intermediate section, the first end positioned on one side of the intermediate section, and the second end positioned on a side of the intermediate section substantially opposite to the first end. The base also has two apertures, each aperture extending from the first end, through the intermediate section, to the second end. The base also has three grooves positioned substantially parallel to each other in the intermediate section, each groove configured to receive a display. The device also comprises two flexible legs, each leg having a first leg end and a second leg end. Each leg is configured to pass through an aperture in the base such that the first leg end extends past the first end of the base, and the second leg end extends past the second end of the base. Each groove is configured to receive the display at a different angle.

In one embodiment, the present invention utilizes 2 or more supporting legs. Each leg is independently adjustable and may be made of any suitable material or materials such that each assembled leg may be manipulated into variable heights and/or planes while retaining their shape after manipulation into the desired positions.

The rigidity, design, and wide footprint of the independently adjustable legs allow for the holding of a tablet computer (or other device) in a suspended position, without having to rest the device on any part of the body of the user. This design also creates a low center of gravity for the device, giving it maximum stability when typing or using the touchscreen. The independently adjustable legs are attached to the base, which can be configured for a number of uses.

In another embodiment, legs attach to a base which holds the display suspended in a fixed position. The legs are independently adjustable. The legs are connected to the base and may be made of any suitable material capable of three dimensional independent movement. The material may be both malleable and obedient to positional changes of the leg. For example, the legs may be formed using "gooseneck" flexible tubing. In some embodiments of the device, the legs may be of various lengths. The present invention may use three or more legs to hold the base in a fixed position, where each leg can move independently of the other legs.

In one embodiment, the device comprises a base having at least three sockets, the device configured to receive a tablet computer and at least three articulating legs attached to the sockets of the base.

In another embodiment, end caps are placed on the ends of each leg. For example, these end caps may be spheres. The end caps may be formed from the same material as the legs or an entirely different material. The end caps may be coated with or formed from a substance to increase friction with the resting surface. Other suitable shapes besides spheres may be used as well. In one embodiment, the end caps may be suction cups used to fix a leg to a surface. In another embodiment, the end caps are configured to be fixedly attached, yet removable to the ends of each leg. For example, a variety of end caps may be provided, such as spherical end caps or suction cup end caps. These end caps may be attached to the ends of the legs through use of a male/female joint, screw or other means as known in the art.

In some embodiments, the legs are securely attached to the base. In other embodiments, the legs are detachable. For example, the legs may connect to the base in such a fashion that they can be removed from the base if a suitable force is applied to each leg. In this way, the legs will detach from the base before damaging the present invention if a force is unintentionally applied to the legs of the present invention.

Figure 9:
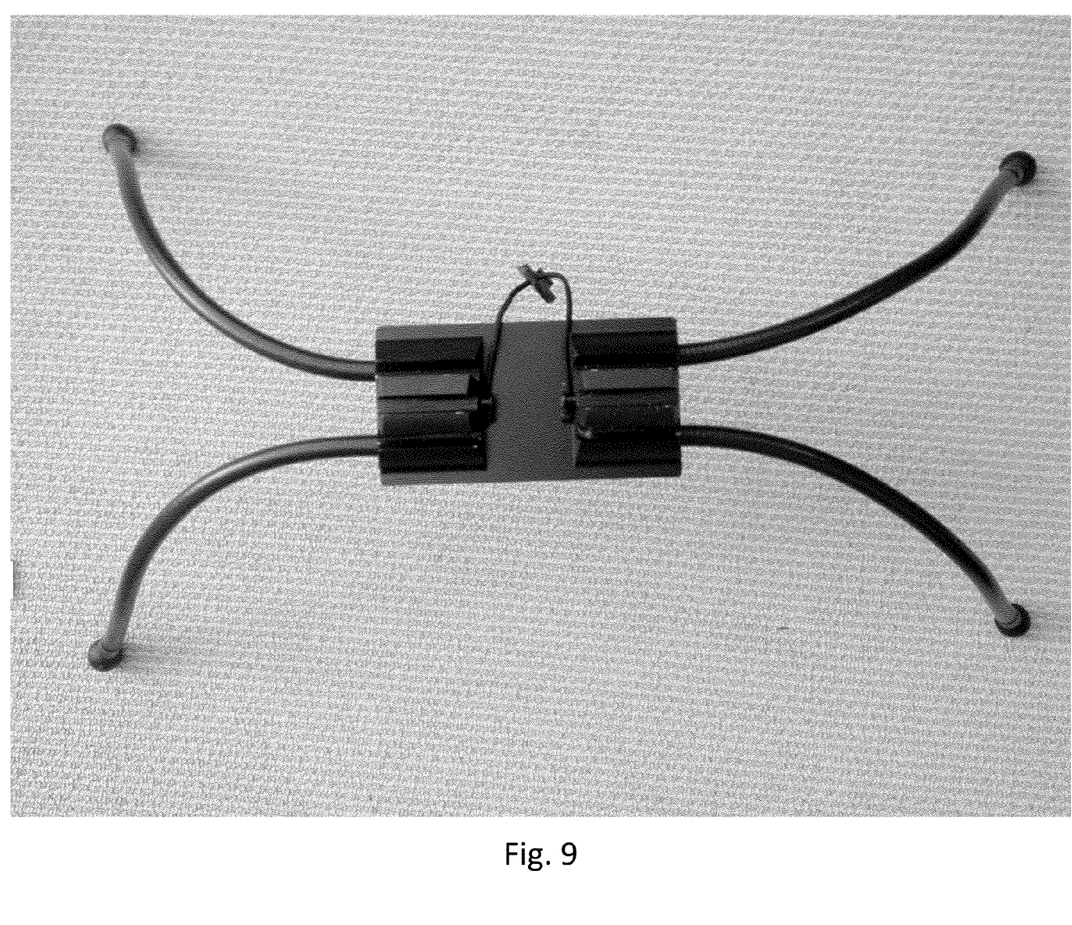
FIG. 9 is a top-down view of one embodiment of the present invention.
Figure 10:
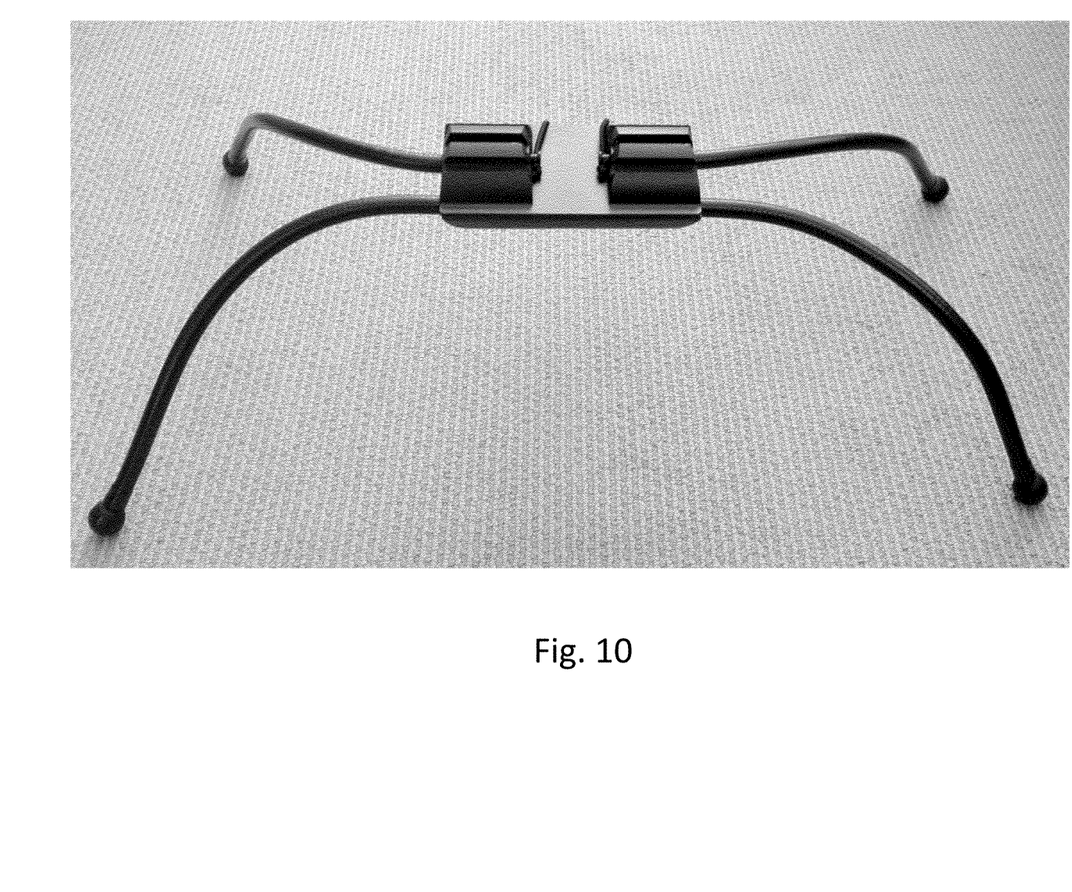
FIG. 10 is a side view of the embodiment of the present invention shown in FIG. 1.

FIG. 9 shows a top-down view of the base and legs according to one embodiment of the present invention. In the shown embodiment, the piece has three grooves into which a tablet computer can be inserted. The three grooves (or slots) are angled in such a way that the tablet computer can be positioned in a viewing angle greater than 90 degrees with respect to the base, 90 degrees with respect to the base (vertical from users perspective) and less than 90 degrees with respect to the base (toward the user). In other embodiments the angles of the grooves may be different. The angles in the shown embodiment are fixed, because groves are formed in the base to hold the tablet computer. However, in other embodiments they may be adjustable to any tilt desired. For example, a groove may be formed by an adjustable swiveling piece connected to the base, such that the groove's angle changes in relation to the base. The base in this embodiment (FIGS. 9-10) also comprises a fitted piece (which attaches to the top of the tablet computer) attached to a chord attached to the base. This fitted piece provides for extra stability and security in keeping the tablet computer mounted to the base. In other embodiments there may be other types of securing mechanisms or no securing mechanism at all. The base in this embodiment (FIGS. 9-10) has a gap that allows for buttons present on some tablet computers to be accessed. In other embodiments, this gap may or may not be present. The base may also serve as a dock or charger for the tablet computer. In another embodiment, the dock may also serve as speakers electronically connected to the tablet computer.

The independent legs may hold a viewing device in an upright and stationary position in a typical user situation (for example, on a bed). In this situation, the legs are independently adjusted such that the end caps make contact with the uneven surface width ample space between the ends of the legs. This spacing allows for greater stability. The width between all legs and the independent adjustability of the legs allow for a stable and hands-free holding of the tablet computer in a typical situation as shown, even when typing or otherwise using the touch-screen interface of the tablet computer.

The invention may hold a tablet computer in a stable position as well as horizontal plane, even on a substantially uneven surface. It should be noted that the legs can be adjusted in any direction to accommodate a variety of uneven surfaces while still holding the tablet computer in not only a stable position but also a horizontal viewing plane.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A device for holding portable electronic units having an edge, the device comprising:
   a base comprising:
      a first end and a second end, the second end substantially opposite the first end;
      two or more apertures, each aperture extending through the base from the first end to the second end; and
      a groove configured to receive the edge of a portable electronic unit; and
   two or more flexible legs, each flexible leg having a first leg end, a second leg end, and a central portion, and the central portion is disposed within said each aperture such that the first leg end extends past the first end of the base, and the second leg end extends past the second end of the base.

2. The device of claim 1, wherein the base has a substantially flat side opposite the groove.

3. The device of claim 1, wherein the groove extends from the first end to the second end.

4. The device of claim 1, wherein the base further comprises a cutout in between the first end and the second end.

5. The device of claim 1, wherein the first end and the second end are substantially parallel to each other.

6. The device of claim 1, wherein the base is configured to prevent the portable electronic unit from moving in the groove.

7. The device of claim 6, further comprising an elastic band, the elastic band anchored to the base and configured to engage a second edge of the portable electronic unit.

8. The device of claim 7, wherein the elastic band has a clip configured to engage the second edge of the portable electronic unit.

9. The device of claim 1, wherein the legs are fixedly attached to the base.

10. The device of claim 1, wherein each first leg end and each second leg end has a removable cap.

11. The device of claim 10, wherein the removable cap is larger than the aperture.

12. The device of claim 10, wherein the removable cap is a suction cup.

13. The device of claim 1, wherein the base further comprises a charging receptacle configured to provide power to the portable electronic unit.

14. The device of claim 1, wherein there is more than one groove, and each groove is configured to hold the portable electronic unit at a different angle.

15. A hands free holding device comprising:
   a base having:
      a first end, a second end, and an intermediate section, the first end positioned on one side of the intermediate section, and the second end positioned on a another side of the intermediate section substantially opposite to the first end;

two apertures, each aperture extending from the first end, through the intermediate section, to the second end; and three grooves positioned substantially parallel to each other in the intermediate section, each groove configured to receive a display; and two flexible legs, each flexible leg having a first leg end and a second leg end;

wherein each flexible leg is configured to pass through an aperture in the base such that the first leg end extends past the first end of the base, and the second leg end extends past the second end of the base; and wherein each groove is configured to receive the display at a different angle.

* * * * *